United States Patent [19]

Davis

[11] Patent Number: 5,562,963

[45] Date of Patent: Oct. 8, 1996

[54] ABSORBENT PADS FOR CONTAINMENT, NEUTRALIZATION, AND CLEAN-UP OF ENVIRONMENTAL SPILLS CONTAINING CHEMICALLY-REACTIVE AGENTS

[75] Inventor: Dennis D. Davis, Las Cruces, N.M.

[73] Assignee: The United States of America as represented by the Administrator of the National Aeronautics and Space Administration, Washington, D.C.

[21] Appl. No.: 298,699

[22] Filed: Aug. 31, 1994

[51] Int. Cl.[6] ........................................................ B32B 3/06
[52] U.S. Cl. ........................ 428/36.1; 428/224; 428/240; 428/283; 428/323; 428/327; 428/340; 428/365; 428/372; 428/376; 428/397; 428/398; 428/402; 210/660; 210/671; 210/484
[58] Field of Search ................................... 428/224, 240, 428/36.1, 283, 323, 327, 340, 365, 372, 376, 397, 398, 402; 210/484, 660, 671

[56] References Cited

U.S. PATENT DOCUMENTS

| | | | |
|---|---|---|---|
| 3,904,528 | 9/1975 | Yocum | 210/242 |
| 4,659,478 | 4/1987 | Stapelfeld et al. | 210/690 |
| 4,804,527 | 2/1989 | Tatarchuk et al. | 423/351 |
| 4,840,734 | 6/1989 | Johnson | 210/660 |
| 4,965,129 | 10/1990 | Bair et al. | 428/398 |
| 5,165,821 | 11/1992 | Fischer et al. | 405/63 |
| 5,186,831 | 2/1993 | DePetris | 210/242.4 |

Primary Examiner—Patrick Ryan
Assistant Examiner—Rich Weisberger
Attorney, Agent, or Firm—Hardie R. Barr

[57] ABSTRACT

A pad for cleaning up liquid spills is described which contains a porous surface covering, and an absorbent interior containing chemically reactive reagents for neutralizing noxious chemicals within the spilled liquid. The porous surface and the absorbent component would normally consist of chemically resistant materials allowing tentative spill to pass. The absorbent interior which contains the neutralizing reagents can but is not required to be chemically resilient and conducts the liquid chemical spill towards the absorbent interior containing the chemically reactive reagents where the dangerous and undesirable chemicals within the chemical spill are then neutralized as well as removed from the premises.

11 Claims, No Drawings

ABSORBENT PADS FOR CONTAINMENT, NEUTRALIZATION, AND CLEAN-UP OF ENVIRONMENTAL SPILLS CONTAINING CHEMICALLY-REACTIVE AGENTS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

This invention relates generally to a pad for the cleanup of liquid spills and, more particularly, to absorb spills containing potentially dangerous chemically reactive materials.

DESCRIPTION OF THE PRIOR ART

The prior art references which teach the cleaning of oil spills, disclose specially shaped and constructed devices for absorbing oil where a particular type of spill occurs. For example, huge boom shaped devices for cleaning oil tanker spills as well as smaller hose shaped devices for placing around leaking machines are disclosed. The surface as well as the absorbent material of some of these devices are designed to absorb fluids such as oil. Other devices for cleaning spills from oil tankers are designed to block the absorption of water and to only allow oil to pass through the surface for collection.

To illustrate, U.S. Pat. No. 3,904,528 issued to Yocum, discloses a closed element for picking up oily contaminant on the surface of body of water with an outer surface which will pass oil but not water. This device is intended to absorb small amounts of oil within a container. U.S. Pat. No. 5,165,821 issued to Fischer, et al., discloses a combined skirted oil-sorbing boom and oil-sorbing sweep with a buoyant inner core and an oil sorbent outer absorbent interior of a spirally wound sheet of polymeric, oleophilic, hydrophobic microfibers. U.S. Pat. No. 5,186,831 issued to DePetris, which discloses an oil sorbing product which comprises an absorbent fiber core encapsulated in an adsorbent sheet, the adsorbent sheet being oleophilic, substantially hydrophobic, incapable of passing oil or water through to the absorbent core. All three disclosures only teach the collecting and cleaning of oil spills.

In the commercial and military world of rockets and rocket engines, a significant concern is the safe handling of rocket fuel, namely hydrazine. Hydrazine is a self-igniting propellant with a flash point temperature of 51° C. (124° F.). Because of hydrazine's explosive characteristics, military and commercial procedures dictate special handling requirements especially for rocket fuel. Nonetheless, spills occur. Because of the danger of the situation, hydrazine spills have heretofore been immediately treated with reactants which neutralize the hydrazine and render the chemical spill inert. However, merely applying neutralizing agents to the spill may also be dangerous because the reaction temperatures can quickly climb to the flash point temperature of the hydrazine. Thus, present neutralization procedures may be just as dangerous as the spill. Finally, even when the neutralization procedures have been safely carried out, the end result is that the chemical reaction which neutralized the hydrazine has created an even larger mess for the cleaning crews. In fact, the product resulting from such a reaction has historically been considered a significant drawback, although a necessary one, of employing such a process.

Prior attempts to solve the problem of undesirable liquid spills include devices for absorbing oil spills either from water or soil or the floor adjacent to a machine containing an oil leak. One attempt discloses a method for neutralizing the reactive elements in a chemical spill prior to commencement of clean up procedures. In particular, U.S. Pat. No. 4,809,527 issued to Tatarchuk, et at. teaches the neutralization of hydrazine in a hypergol spill prior to cleaning the spill.

U.S. Pat. No. 4,804,527 issued to Tatarchuk, et al. teaches the use of a copper oxide on a porous support which is applied to a hypergolic spill (such as hydrazine) to safely render it harmless for removal. Tatarchuk states that neutralization is achieved by drawing aqueous hydrazine into the pores of the porous support, such as clay, where a reduction of the redox reaction occurs. Care is still required to prevent disaster. Even after successful neutralization of a spill, a mess remains which still must be removed. The end result frequently necessitates a significant mount of effort to remove and clean the surface upon which the reacted products are posited. Thus, what is needed is a product for use in cleaning the initial spill in a manner that chemically neutralizes the active reagents of the spill and yet remains handy for removal.

SUMMARY OF THE INVENTION

To solve the above-discussed environmental problems, a broad aspect of the present invention includes a liquid absorbing pad to absorb a liquid spill and also neutralize reactive agents within it. The pad has a porous surface cover which give the article a shape, carrying an inert absorbent interior component which, in turn, surrounds an absorbent interior core comprising a chemical reagent capable of reacting with a toxic dangerous or just unwanted component of the spill such that the spill components are neutralized within the pad while being cleaned from the substrate.

Further, the absorbent interior core can include some of the same materials as the absorbing component with the only difference being the presence of chemically reactive reagents to neutralize the spilled liquid. The absorbent interior core may be a different material altogether. The absorbing component draws the liquid chemical spill through the porous surface to the reactive core.

The core of the pad may be an acid for the neutralization of caustic spills, a base reagent for the neutralization of acid spills, a chelating or precipitating reagent for spills containing metallic salts in solution, or an oxidizing agent for reaction with spills containing certain organic materials such as, for example, hydrazine. This invention is very flexible in that it can be used for cleaning a whole host of noxious chemicals, including hydrazine, whenever a chemical spill occurs and still further the removed residue is simple since the pads containing the now harmless spill components are easily scooped up for safe disposal.

DETAILED DESCRIPTION

In the practice of the present invention, an absorbent pad includes a porous outer fabric surface covering that draws toxic liquid from a chemical spill on a substrate to a liquid absorbing component and further for neutralization and containment of the toxic liquid within the pad. The surface covering material is desirably a chemically resistant cloth or cloth-like material which will shape and maintain the integrity of the pad while containing the inner components and absorbed liquid during use and cleanup. A preferred material is woven polypropylene because of its strength and known affinity to absorb many noxious liquids. Many other porous materials well known in the art can be used for this porous outer fabric surface. The types of materials which are available for use as a surface covering can be determined by examining spill pillows that are already commercially available and through simple experimentation. For example, see U.S. Pat. Nos. 4,659,478 and 4,965,129, incorporated herein by reference for all purposes, which discusses the use of cotton, rayon, nylon and like materials to create a number of porous fabric, outer "bags". Of course, a significant consideration is the ability of the material to withstand the chemicals with which it will come into contact and the physical abuse of spreading and collecting. This "bag" may be of any convenient shape, but a pillow or sausage shape is preferred.

An absorbent component is disposed inside the outer fabric bag with an absorbent interior or core. The absorbent component and absorbent interior may be a material such as a fibrous polyolefin, finely divided polyethylene, silica gel, absorbent clay, and the like to draw the spilled liquid through the porous surface covering, thereby removing it from the substrate and to conduct the liquid to the interior core of the pad where it reacts with an appropriately selected reactive neutralizing agent. Other suitable absorbent materials for containment within the outer fabric surface core are described in the incorporated U.S. Pat. No. 4,965,129. Furthermore, the absorbent component within the porous surface covering should be chemically inert if the reaction rate must be controlled since the mass transfer kinetics through the inert material limits the rate at which the reactive chemicals of the absorbent material and of the spill come into contact. If the reaction rate is not a concern, the absorbent component within the porous surface could be completely comprised of chemical reagents for neutralizing the toxic liquid.

The absorbent interior core of the pad is disposed, or imbedded within the absorbent component and includes chemical reagents specifically selected for reacting with components of the liquid spill. In one embodiment of this invention, the reactive reagents of the interior core may be enclosed in one type of absorbent material throughout the pad, such as, for example, polyethylene. Alternatively, the absorbent interior core may use a different type of absorbent material such as an absorbent silica gel to act as a support for the reactive chemical reagent, such as, copper Oxide. Such choices depend on the design goals and the requirements of the types of liquids which are to be absorbed. Preferably, the reactive core material will be enclosed in a second porous pad imbedded in the absorbent component. Thus, the interior could be removed and replaced after every use thereby creating a reusable portion if it results in a more efficient utilization of resources.

It is not necessary for the absorbent interior core and the chemical reagent to be separate but may be physically mixed components. The mixture may either be a purely physical mixture or a chemical combination comprising a single material. A person skilled in the art will readily be able to make these choices based upon the disclosure of the specification, analysis of the liquid spill components, design requirements and reagent availability without undue experimentation.

In the practice of this invention, the interior core will be a chemical reagent which will react with and neutralize or isolate troublesome components of liquid spills. For example, use of an acid reagent (certain acid clays like montmorillonite are useful) for the neutralization of caustic spills; a base reagent for the neutralization of acid spills; chelating or precipitating agents for spills containing metallic salts in solution (mercury, cadmium, etc.); oxidizing agents for reaction with spills containing certain organic agents. The size and shape of the pad of this invention is such that it is easily removed from the substrate for discarding or cleaning and reuse in some cases.

Of particular importance in the practice of this invention is the removal of a hydrazine spill to which much attention has been given in the prior art cited above, particularly U.S. Pat. No. 4,804,527, incorporated herein for all purposes. In the instance of the removal of hydrazine, the interior core of the pad of this invention includes a reducing metal oxide, preferably a copper oxide and most preferable cupric oxide (CuO). The reducing oxide, when coming in contact with the hydrazine, oxidizes the hydrazine to hydrogen gas and water. Since the reaction and safety considerations are amply discussed in the incorporated U.S. Pat. No. 4,804,527, no further discussion is needed here. In the preferred embodiment of the practice of this invention, the absorbent reactive core of the pad of this invention is a second porous pad or pillow imbedded within the fibrous absorbent component, preferably a fibrous polyethylene made up of a oxidizing metal oxide, preferably a copper oxide. Since hydrazine is highly reactive and gives off considerable energy in the oxidation reaction, it is preferred that the copper oxide be intimately mixed with an absorbent clay such as, for example, bentonite or incorporated into a silica gel where the rate at which the hydrazine reacts could be controlled.

To illustrate this preferred embodiment of the practice of this invention, without limitation of the scope of such invention, a test pad was constructed using an outer surface cover of woven polypropylene. It was sewn in the form of a bag which was filled with an inert absorbing component, a polyethylene fibrous mass as a filler. The absorbent inner core was a nylon mesh cloth inner pillow containing 1000 grams of 10% CuO supported on an absorbent silica gel. The nylon mesh was stuffed with the absorbent silica gel which was imbedded within the fibrous polyethylene filler of the woven polypropylene pad. This was used to remove a hydrazine spill, under lab conditions, diluted with water.

In use, the hydrazine was diluted with water before the pad was applied to "clean up" the spill. The water in an aqueous hydrazine solution assists in the chemical reaction by allowing the hydrazine to gradually migrate to the absorbent interior where the aqueous hydrazine is converted by the silica gel/CuO reagent to innocuous products, namely nitrogen and water and by assisting in the reduction of the CuO. The amount of water to be added is not strictly defined and can be varied by those skilled in the art without an undue amount of experimentation.

The quantity and relative ratios of the components used in creating a pad are a function of reaction characteristics and related considerations. In the example above, the silica gel/CuO was prepared by dissolving 372 grams of Cupric Nitrate Hexahydrate $CU(NO_3)_2.6H_2O$ in water to make one liter of aqueous solution. It is then absorbed into a silica gel and heated. However, one skilled in the art has the ability to examine the parameters of the chemical reaction and utilize those parameters in conjunction with the disclosure herein to create a pad which will operate effectively and safely for a particular spill in question, particularly hydrazine. For the specific pad described herein, the combination of the polyethylene filler and the silica gel as the two absorbent materials established a sufficiently slow absorption rate that the chemical reaction between the aqueous hydrazine and the copper oxide did not reach the flash point temperature of 51° C. (124°) for hydrazine.

The foregoing disclosure and description of the invention are illustrative and explanatory thereof and various changes in the size, shape, combination of materials or chemical elements, and the details of the illustrated construction as well as the methods may be made without departing from the scope of the invention. It is understood that the invention is not limited to the specific embodiments or methods disclosed above for the purpose of exemplification and that many modifications and changes will be apparent from the description without departing from the scope of the attached claims.

I claim:

1. A liquid absorbing pad for cleaning a chemically hazadous liquid spill from a substrate comprising:

a porous outer fabric surface cover to contain and shape inner components;

an absorbent component disposed within the porous surface cover for conducting spilled liquid through the porous outer fabric surface cover toward the interior of the pad; and an interior core disposed within the absorbent component which comprises a chemical reagent for neutralizing the spilled chemically hazadous liquid being cleaned.

2. The liquid absorbing pad of claim 1 wherein the chemical reagent in the interior core is enclosed in an inner porous fabric bag.

3. The liquid absorbing pad of claim 2 wherein the chemical reagent in the interior core is a reducible metal oxide for reacting with a liquid hydrazine spill.

4. The liquid absorbing pad of claim 3 wherein the reducible metal oxide is a copper oxide.

5. The liquid absolving pad of claim 4 wherein the copper oxide is cupric oxide.

6. The liquid absorbing pad of claim 1 wherein the chemical reagent in the interior core is mixed with an absorbent material inert to the liquid of the spill.

7. The liquid absorbing pad of claim 6 wherein the interior core comprises a silica gel containing from about 7 weight % to about 15 weight % CuO for reacting with a liquid hydrazine spill.

8. The liquid absorbing pad of claim 1 wherein the interior core comprises an acid for reacting with a caustic chemical spill.

9. The liquid absorbing pad of claim 1 wherein the interior core comprises a basic reagent for reacting with an acidic liquid spill.

10. The liquid absorbing pad of claim 1 wherein the interior core comprises a chelating agent for reacting with metallic salts the liquid spill.

11. The liquid absorbing pad of claim 1 wherein the absorbent interior component comprises a precipitating agent for salts in the liquid spill.

* * * * *

UNITED STATES PATENT AND TRADEMARK OFFICE
CERTIFICATE OF CORRECTION

PATENT NO. : 5,562,963
DATED : October 8, 1996
INVENTOR(S) : Dennis D. Davis

It is certified that error appears in the above-indentified patent and that said Letters Patent is hereby corrected as shown below:

In the specification, column 4, lines 13 and 15, the word "reducing" should read --reducible--; line 16, the word "hydrogen" should read --nitrogen--.

Signed and Sealed this

Tenth Day of June, 1997

Attest:

BRUCE LEHMAN

Attesting Officer

Commissioner of Patents and Trademarks